United States Patent
Haggans et al.

(10) Patent No.: US 7,280,762 B1
(45) Date of Patent: Oct. 9, 2007

(54) OPTICAL COMMUNICATION SYSTEM HAVING DYNAMIC GAIN EQUALIZATION

(75) Inventors: Charles Haggans, Clarksville, MD (US); Yunfeng Shen, Baltimore, MD (US)

(73) Assignee: CIENA Corporation, Linthicum, MD (US)

(*) Notice: Subject to any disclaimer, the term of this patent is extended or adjusted under 35 U.S.C. 154(b) by 672 days.

(21) Appl. No.: 10/395,488

(22) Filed: Mar. 24, 2003

(51) Int. Cl.
- *H04J 14/02* (2006.01)
- *H04B 10/08* (2006.01)
- *H04B 10/00* (2006.01)

(52) U.S. Cl. .................. 398/94; 398/38; 398/158; 398/160

(58) Field of Classification Search ............ 398/37, 398/38, 91, 94, 149, 158, 160
See application file for complete search history.

(56) References Cited

U.S. PATENT DOCUMENTS

| | | | |
|---|---|---|---|
| 6,424,459 B1* | 7/2002 | Yokota | 359/341.42 |
| 6,433,904 B1* | 8/2002 | Swanson et al. | 398/91 |
| 6,882,466 B1* | 4/2005 | Shimojoh et al. | 359/334 |
| 6,961,522 B1* | 11/2005 | Castagnetti et al. | 398/92 |
| 2002/0154359 A1* | 10/2002 | Tsuda et al. | 359/124 |

OTHER PUBLICATIONS

A. R. Pratt et al., Marconi, Coventry, UK: "5,745 km DWDM transcontinental field trial using 10 Gbit/s dispersion managed solitons and dynamic gain equalization," pp. PD26-1 to PD26-3.
Heather Patrick, Optinel Systems, Inc. USA: "Gain and Power Equalization," OFC 2003, Tuesday Afternoon, vol. 1, p. 244.

* cited by examiner

*Primary Examiner*—Dalzid Singh
(74) *Attorney, Agent, or Firm*—Clements Walker; Christopher L. Bernard; Tyler S. Brown (57) ABSTRACT

An optical communication device, and related method, are provided for providing a tailored, spectrally non-uniform gain over a broad spectrum. In particular, the optical communication device includes an optical amplifier having a dynamic gain equalization (DGE) circuit that adjusts the gain spectrum of the optical amplifier to provide uniform gain, at a desired level, within individual channel bands in accordance with the data rates of channels in those bands. Accordingly, the overall spectrum has a "stepped" profile with higher gain values for high data rate channels and lower gain values for lower rate channels. As a result, a WDM system can accommodate multiple data rate signals by providing spectrally uniform high gain for high data rate channels, and low gain for lower rate channels. Improved signal quality can thus be achieved for both high speed and low speed signals in a single WDM system.

16 Claims, 6 Drawing Sheets

OPTICAL COMMUNICATION SYSTEM HAVING DYNAMIC GAIN EQUALIZATION

BACKGROUND OF THE INVENTION

Wavelength division multiplexing (WDM) has been explored as an approach for increasing the capacity of fiber optic networks. In a WDM system, plural optical signals or channels are combined onto a single optical fiber with each channel being assigned a particular wavelength. Such systems typically include a demultiplexer for separating and supplying the channels to corresponding receivers for further processing or retransmission of data carried by the channels.

Optical signals or channels in a WDM system are frequently transmitted over silica based optical fibers, which typically have relatively low loss at wavelengths within a range of 1525 nm to 1580 nm. WDM optical signal channels at wavelengths within this low loss "window" can be transmitted over distances of approximately 50-100 km and remain detectable by conventional receiver circuits. For distances beyond 100 km, however, optical amplifiers are required to compensate for optical fiber loss.

Optical amplifiers have been developed which include an optical fiber doped with erbium. The erbium-doped fiber is "pumped" with light at a selected wavelength, e.g., 980 nm, to provide amplification or gain at wavelengths within the low loss window of the optical fiber. However, erbium doped fiber amplifiers do not uniformly amplify light within the spectral region of 1525 to 1580 nm. For example, an optical channel at a wavelength of 1540 nm, for example, is typically amplified 4 dB more than an optical channel at a wavelength of 1555 nm. While such a large variation in gain can be tolerated in a system with only one optical amplifier, it cannot be tolerated for a system with plural optical amplifiers or numerous, narrowly spaced optical channels. In which case, much of the pump power supplies energy for amplifying light at the high gain wavelengths rather than amplifying the low gain wavelengths. As a result, low gain wavelengths suffer excessive noise accumulation after propagating through several amplifiers.

Accordingly, optical filters have been incorporated into so-called "gain flattened" amplifiers to provide a substantially uniform amplifier gain spectrum. Moreover, a variable optical attenuator can be provided mid-stage in an optical amplifier to provide gain flatness over a wide range of optical input power levels, as discussed further in U.S. Pat. No. 6,057,959, incorporated by reference herein.

Gain flattened amplifiers have often been deployed in systems in which each WDM signal carries data at the same rate. In many applications, however, system requirements may dictate multiple WDM signals carrying both high and low data rate channels. The high data rate channels comprise relatively short pulses having higher intensity than the longer duration, lower intensity pulses that make up the lower rate channels. Since conventional optical amplifiers are typically configured to provide uniform gain for a given signal strength, such amplifiers may impart insufficient gain to the high data rate channels. In which case, a non-uniform spectrum is desired whereby each of the high data rate channels has a first gain, while each of the lower data rate channels has a second, preferably lower gain. Conventional gain flattened optical amplifiers are configured to have a uniform gain for WDM channels at a given intensity level, such as those having the same data rate, and therefore cannot provide the requisite gain spectrum for WDM systems optical signals at different data rates.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION OF THE PREFERRED EMBODIMENTS

An optical communication device and related method are provided for providing a tailored, spectrally non-uniform gain over a broad spectrum. In particular, the optical communication device includes an optical amplifier having a dynamic gain equalization (DGE) circuit that adjusts the gain spectrum of the optical amplifier to provide a desired tilt, or alternatively uniform gain at a desired level, within individual channel bands in accordance with the data rates of channels in those bands. Accordingly, the overall spectrum has a "stepped" profile with higher power values for high data rate channels and lower power values for lower rate channels. As a result, a single WDM system accommodating multiple data rate signals can be realized, as well as improved signal quality for both high and low speed signals.

Figure 1:
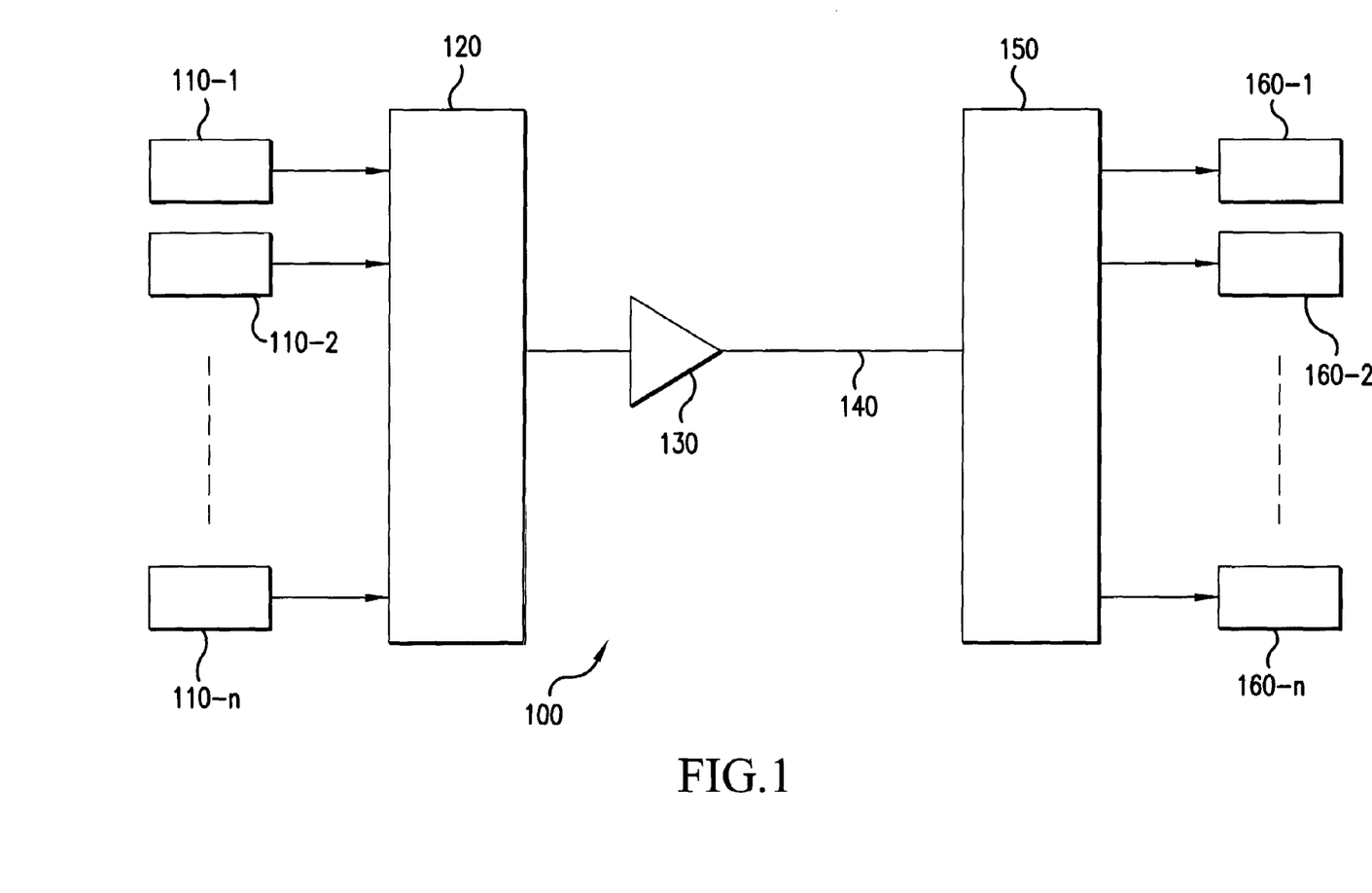
FIG. 1 illustrates a block diagram of a WDM system consistent with a feature of the present invention.

Turning to the drawings in which like reference characters indicate the same or similar elements in each of the several views, FIG. 1 illustrates a WDM system 100 consistent with an aspect of the present invention. WDM system 100 includes a plurality of optical signal emitters or transmitters, 110-1 to 110-n, which can be similar to, if not the same as, transmitters or remodulators disclosed in U.S. Pat. No. 5,715,076, incorporated reference herein. Emitters 110-1 to 110-n each emit an optical signal at a corresponding one of a plurality of wavelengths $\lambda_1$ to $\lambda_n$. The optical signals can be grouped into bands, with selected bands carrying higher rate signals, such as OC-192 signals, while other bands carry lower rate signals, such as OC-48 signals.

The optical signals are next combined by optical multiplexer or combiner 120 onto optical communication path 140, including, for example, an optical fiber. Optical communication path 140 can include one or more segments of conventional optical fiber, such as TrueWave Classic commercially available from Lucent Technologies, and LS and e-LEAF commercially available from Corning. Amplifier 130 shown in FIG. 1 is representative of a plurality of optical amplifiers coupled to optical communication path 140, to be discussed in greater detail below. Although not shown in FIG. 1, a DGE circuit may be provided in optical amplifier 130, and an optical performance monitoring circuit can be included for controlling the DGE circuit. Both the DGE and OPM circuits are discussed in greater detail in U.S. patent application Ser. No. 10/144,082, incorporated by reference herein.

After propagating through the span or substantially the length of optical communication path 140, the optical signals are separated by optical demultiplexer 150 and supplied to receiver circuits 160-1 to 160-n. Although shown separately in FIG. 1, the demultiplexer can include a plurality of in-fiber Bragg gratings packaged with a receiver circuit (including a photodiode, for example), which can be incorporated into a remodulator (as further discussed in U.S. Pat. No. 5,715,076). Demultiplexer 116 can also have a structure similar to that disclosed in U.S. Pat. No. 6,281,997, incorporated by reference herein.

Figure 2:
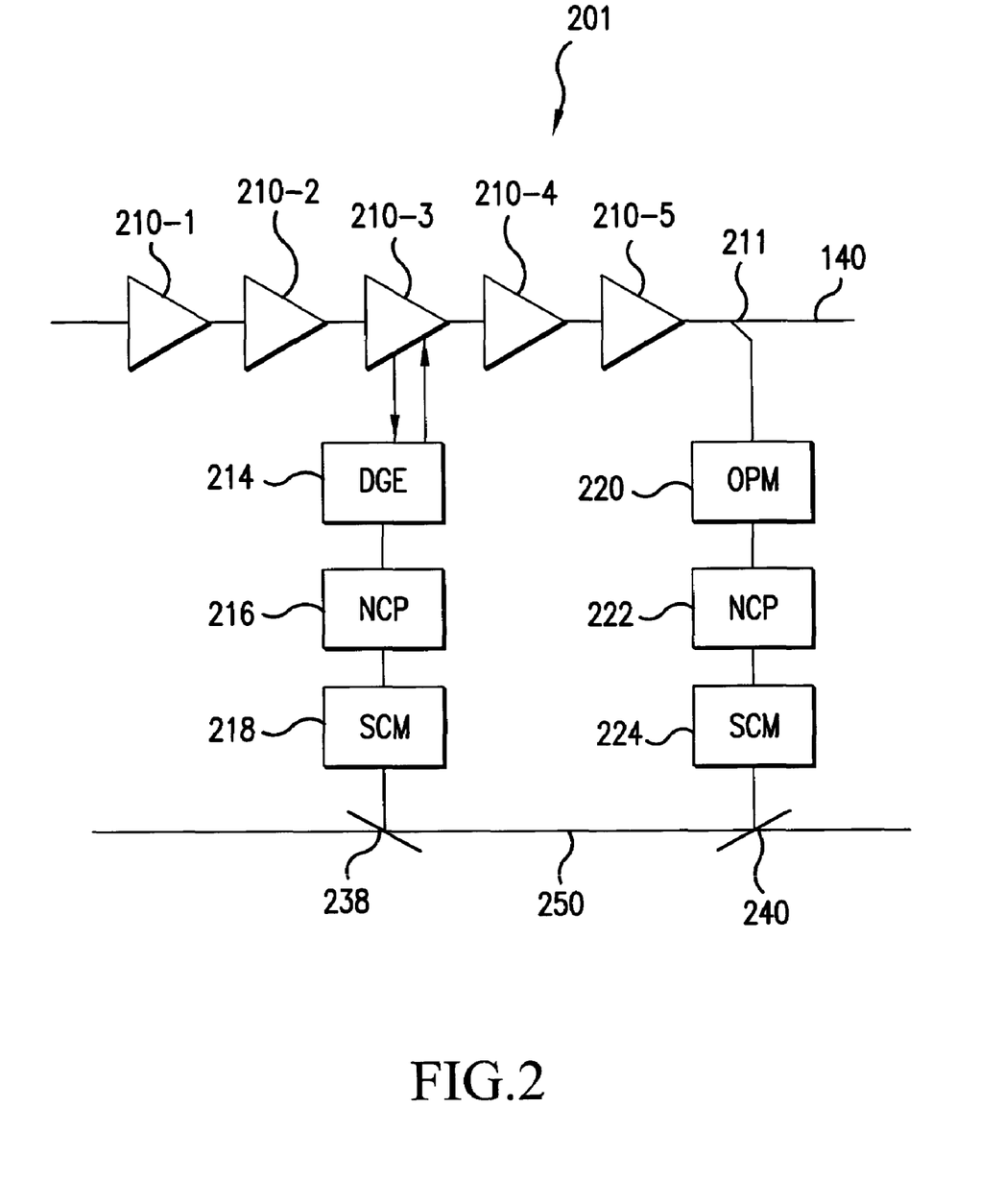
FIG. 2 illustrates in greater detail a portion of the WDM system shown in FIG. 1.

FIG. 2 illustrates an arrangement including optical amplifiers 210-1 to 210-5. The output of the last optical amplifier, amplifier 210-5, is coupled to optical performance monitoring (OPM) circuit 220 via optical tap 211. As discussed in greater detail below, OPM 220 senses the optical signals, and generates a sense signal in response thereto. The sense signal is supplied to a conventional microprocessor otherwise referred to as a node control processor circuit (NCP) 222, which interprets the sense signal and determines appropriate control information to be supplied to upstream DGE 214 for equalizing the power of the optical signals and reducing ripple or otherwise achieving a desired power spectrum. The control information is supplied to a service channel modem (SCM) 224, which outputs an optical service channel typically having a wavelength (e.g., 1310 or 1625 nm) different than other user information channels propagating on optical communication path 250 having wavelengths at about 1550 nm. The service channel is supplied to path 250 via a conventional multiplexer, such as a filter 240, as disclosed in U.S. Pat. No. 5,532,864, incorporated by reference herein. The service channel propagates to filter 238 and is supplied to service channel modem 218, which outputs an electrical signal carrying the control information to NCP 216. The control information is then used to output an appropriate control signal to DGE 214 in amplifier 210-3 for adjusting the power levels of optical signal propagating therein.

Figure 3:
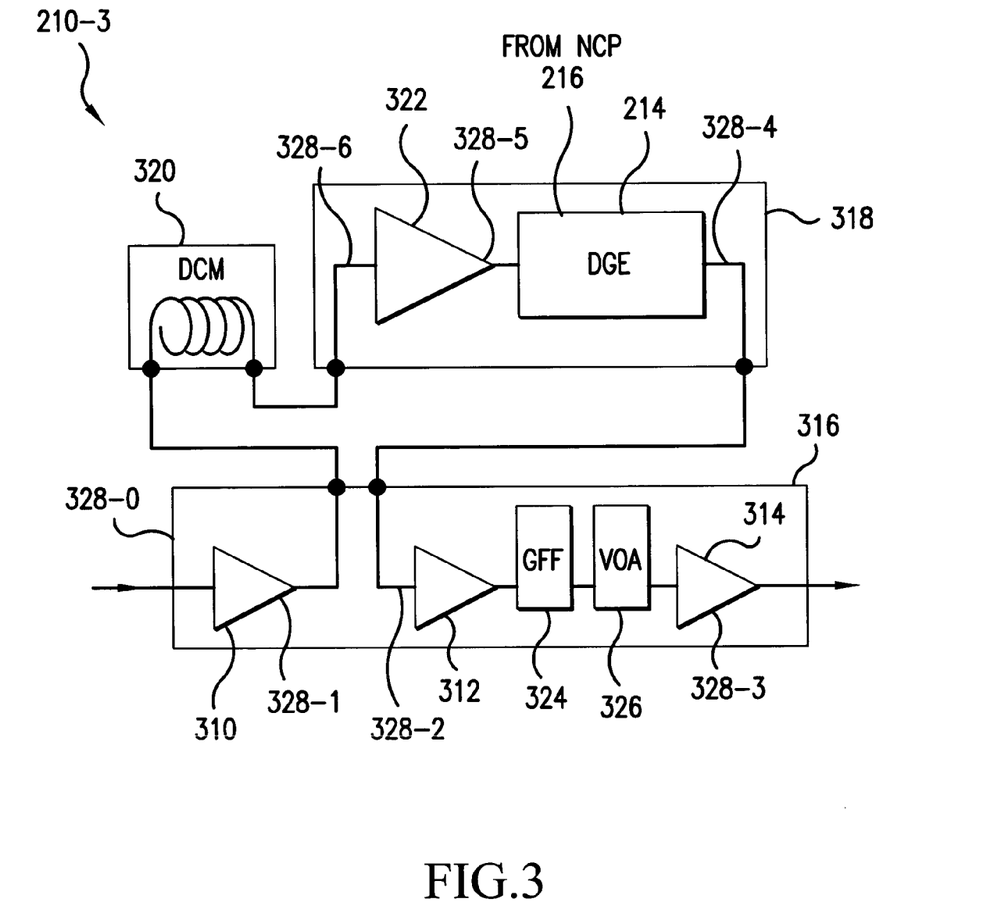
FIG. 3 illustrates an optical amplifier consistent with an aspect of the present invention.

FIG. 3 illustrates an optical amplifier 210-3 and associated connections to DGE 214 in greater detail. Amplifier 210-3 typically has a first amplifier stage 310, including for example, a segment of optical fiber doped with a fluorescent impurities, e.g., erbium, and pumped with light sufficient to excite the impurities to thereby impart optical gain to the WDM optical signal. Such fibers and pump sources are disclosed, for example, in U.S. Pat. Nos. 5,696,615 and 5,778,132, incorporated by reference herein. Amplifier stage 310 receives the input WDM optical signals, and supplies an amplified WDM optical signal to dispersion compensating module (DCM) 320, which can include one or more segments of conventional dispersion compensating fiber to provide suitable dispersion compensation of the WDM optical signal. Next, the WDM optical signal is supplied to an additional amplifier stage 322, also including a segment of erbium doped fiber, for example, to further amplify the signal. The WDM optical signal is then output from amplifier stage 322 and fed to DGE 214. DGE 214 is commercially available from Lightconnect and JDS Uniphase, for example, and has a controllable, wavelength dependent transmission spectrum. Accordingly, the DGE can selectively attenuate each optical signal on a channel-by-channel basis, subject to slope limitations for channels in relatively close proximity.

Optionally, taps 328-0-328-6 can be provided to monitor optical power signals levels at various points within amplifier 210-3, as further shown in FIG. 3.

Typically, an electrical signal-to-noise (Q) ratio associated with each received signal (i.e., an optical signal that has been converted to an electrical signal in one of the receiver circuits) should be approximately the same for each channel in the WDM signal so that each signal can propagate the same distance even if the WDM signal contains channels carrying data at different rates. Q is related to signal power $P_{in}$ input to the receiver circuit and electrical bandwidth of the received optical signals $B_e$ by the following formula (assuming propagation in the "linear regime" in which propagation distance is amplified spontaneous emission (ASE) noise limited):

$$Q^2 \propto P_{in}/B_e$$

Since $P_{in}$ is directly proportional to the optical signal to noise ratio (OSNR) of a signal, the above expression can be rewritten in terms of OSNR as:

$$Q^2 \propto OSNR/B_e$$

Thus, OSNR and $P_{in}$ for different signals should track the electrical bandwidth $B_e$ of each signal in order to obtain the same Q values. Accordingly, for example, for a 10 Gbit/sec signal to have the same Q value as a 2.5 Gbit/sec signal, the signal power and OSNR should be four times that of the 2.5 Gbit/sec signal. In a WDM system having signals at different data rates, higher data rate signals should have different OSNR values and power levels than lower rate signals in order that both the lower and higher rate signals have substantially the same Q values.

Power levels and OSNR values can be controlled, at least in part, by the amount of amplification or gain imparted to the optical signals by optical amplifiers in the system. Inclusion of a DGE in an optical amplifier can alter the gain spectrum of the amplifier to provide suitable power levels and OSNR so that desired Q values can be achieved for signals carrying data at different rate.

Figure 4:
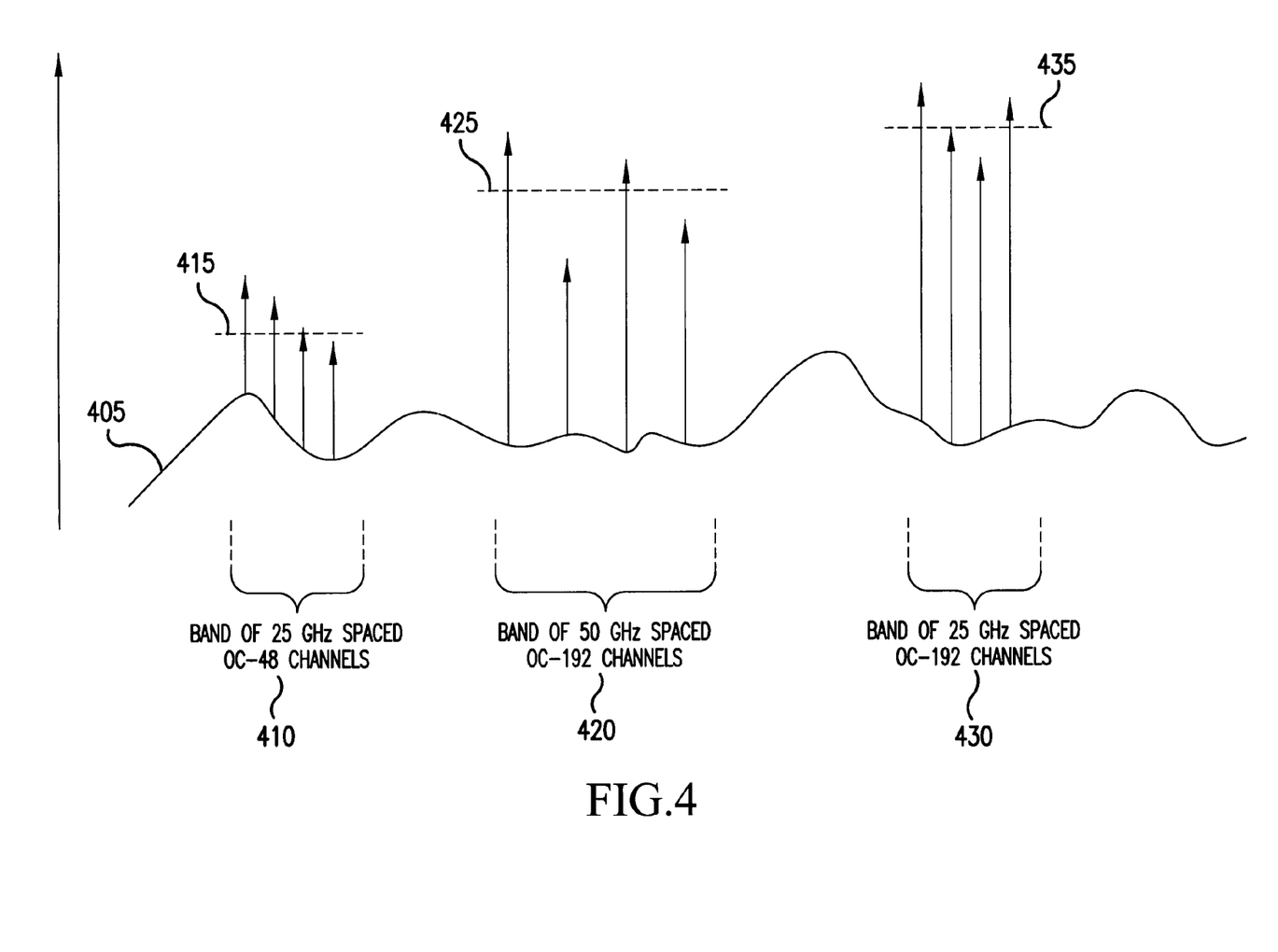
FIG. 4 illustrates an optical signal spectrum without signal power adjustment.

For example, FIG. 4 shows a wavelength dependent intensity spectrum 405 of optical amplifier 210-3 in system 100 is shown with out DGE power adjustment. Arrows in the figure represent individual channels and their relative intensity. In the example shown in FIG. 4, the channels are grouped into several bands of optical signals having non-uniform intensity values due to variations in spectrum 405. Band 410 includes OC-48 optical signals (carrying data at about 2.5 Gbit/sec, and conforming to either SONET or SDH protocols) spectrally spaced from one another by 25 GHz, and band 420 includes 50 GHz spaced OC-192 signals (carrying data at about 10 Gbit/sec, and conforming to either SONET or SDH protocols). In addition, band 435 includes 25 GHz spaced OC-192 signals.

As further shown in FIG. 4, each of bands 410, 420 and 430 has a corresponding target or preferred intensity level 415, 425 and 435, respectively. At these target levels, associated Q values for each of the signals in bands 410, 420 and 430 are substantially equalized or uniform. As shown in FIG. 4, however, without signal intensity adjustment, these desired target levels are not obtained.

The power level associated with each channel, however, can be adjusted by passing the signals through amplifier stage 322 and DGE 214. Assuming amplifier stage 322 can supply up to G dB of gain while DGE 214 can import loss in a range of $L_1$ to $L_2$ ($L_1 < G$ and $G < L_2$) then the combination of amplifier stage 322 and DGE 214 can impart G-$L_1$ of gain to $L_2$-G of loss to signal input to stage 322 and DGE 214. For example, if amplifier stage 322 supplies up to 9 dB of gain and DGE 214 has a loss that varies from 5 dB to 20 dB, the combination of amplifier stage 322 and DGE 214 can impart between 4 dB of gain to 11 dB of loss to signal power levels input to stage 322 and DGE 214. Since the DGE can selectively adjust power levels of individual signals on a channel-by-channel basis (subject to slope constraints), those signals or channels lying below the target power values in FIG. 4 can be increased, while those above can be decreased.

Figure 5:
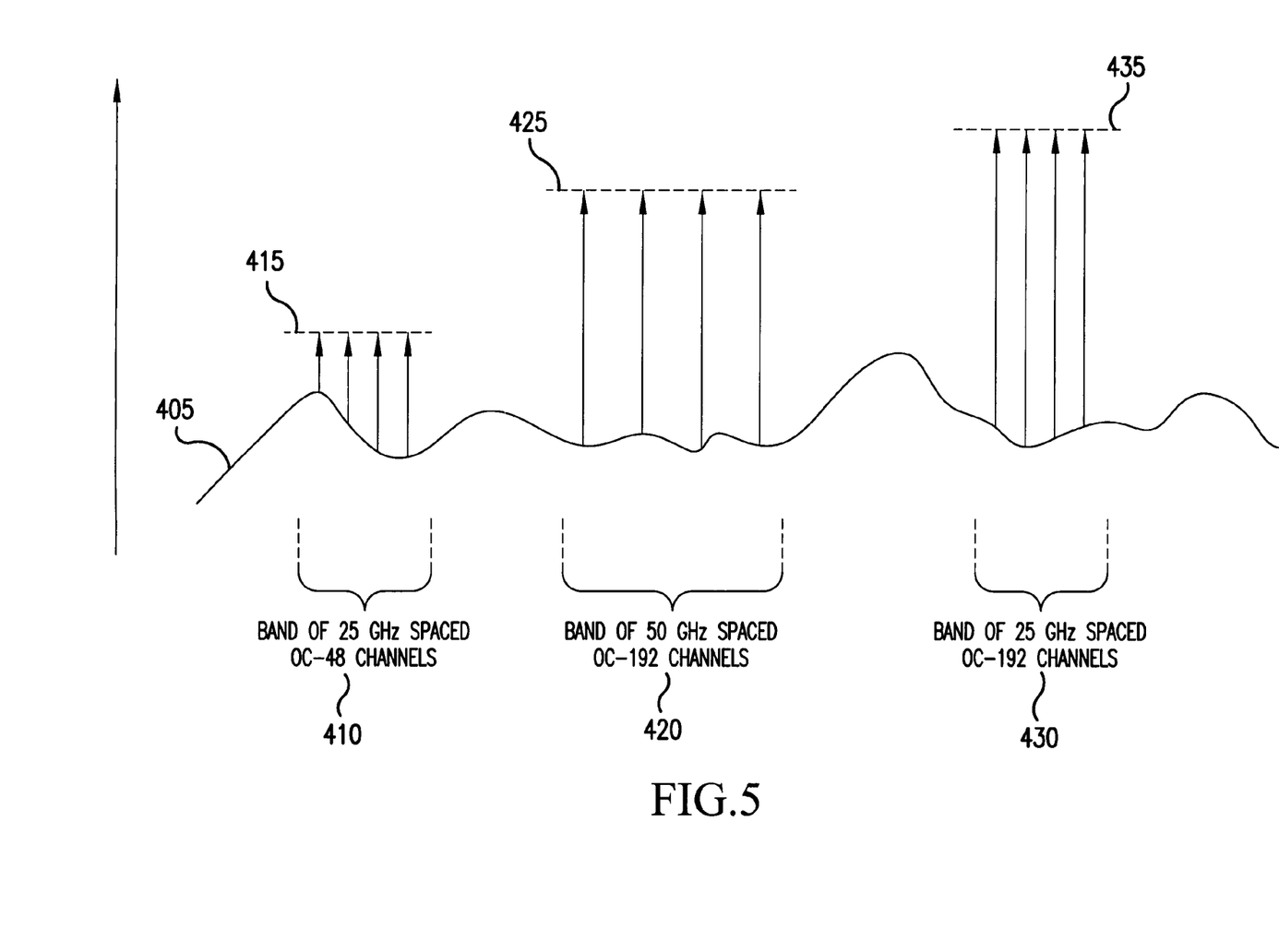
FIG. 5 illustrates an optical signal spectrum with signal power adjustment consistent with an aspect of the present invention.

As a result, as shown in FIG. 5, each signal intensity or power within a given band can be equalized to the target level. For example, power levels of each optical signal within a first group or band 410 in FIG. 5 are selectively adjusted to have a first intensity value or target value 415, while power levels of each optical signal within a second group or band 420 are selectively adjusted to have a second intensity value 425. In addition, power levels of optical signals in a third band 430 are substantially equalized to target value 435. As further shown in FIG. 5, target value 435 is greater than target value 425, which, in turn, is greater than target value 415.

Figure 6:
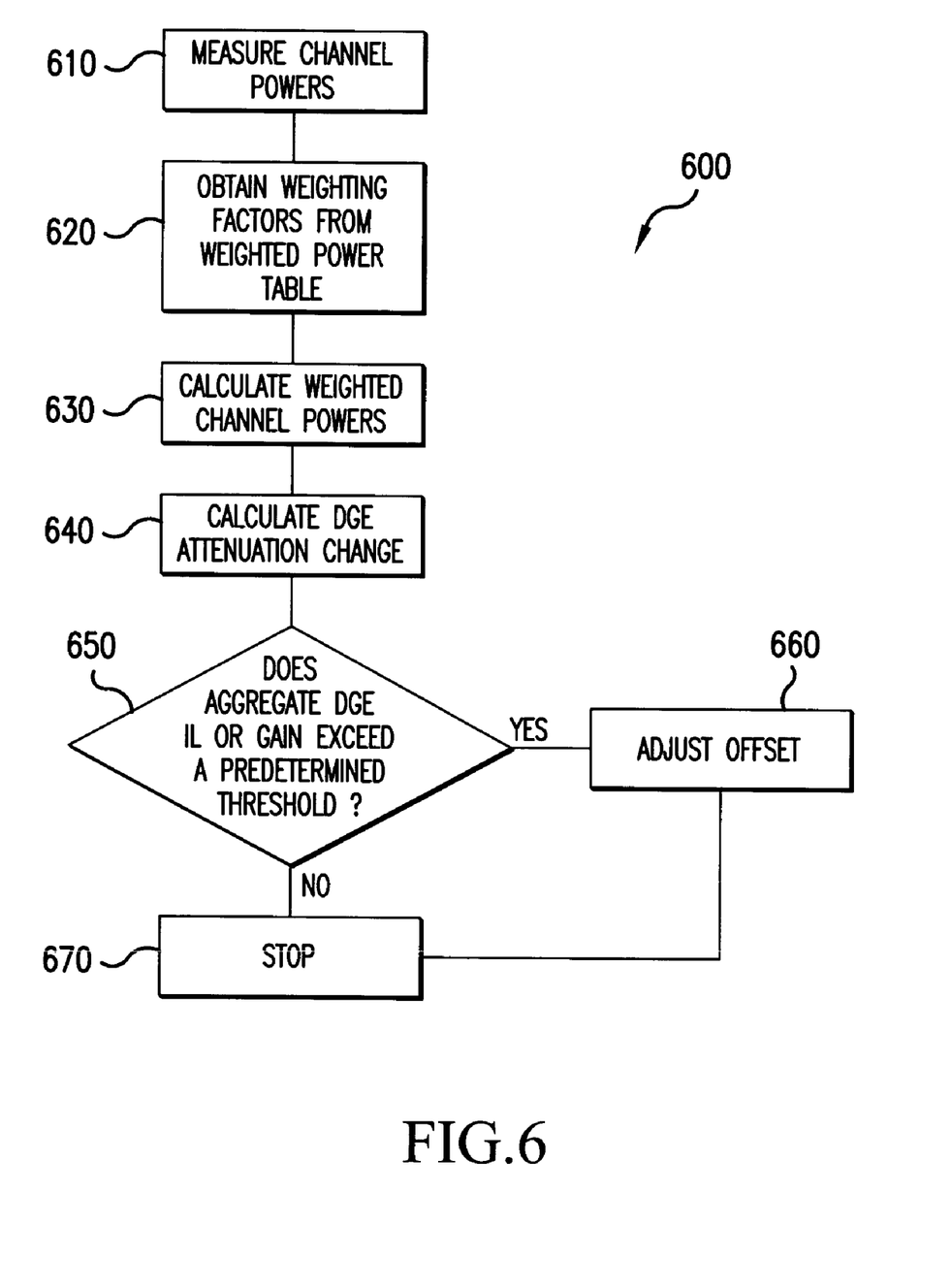
FIG. 6 is a flow chart illustrating steps of a method consistent with an aspect of the present invention.

FIG. 6 illustrates a flow chart 600 showing a method for adjusting multiple rate signals to a desired power spectrum. In a first step 610, individual channel powers are measured, for example, at OPM 220 in FIG. 2. OPM 220 generates a signal including these channel power values which is then transmitted to NCP 216 via a service channel, as discussed above. NCP 216 includes a memory or table including weighting factors, which are parameter values used to calculate an appropriate signal power adjustment to achieve desired target values. In step 620, the weighting factors are obtained from the weighted power table, and in step 630 weighted powers are calculated, typically by NCP 216, by subtracting the weighting factor for each channel from its corresponding measured power level. Table 1 shows exemplary measured channel powers (in units of dBm), weighting factors (in units of dB), and calculated weighted channel powers (in units of dBm) in a system having five channels having wavelengths within a narrow range about 1550 nm.

TABLE 1

| CHANNEL | 1 | 2 | 3 | 4 | 5 |
|---|---|---|---|---|---|
| MEASURED POWER | 0 | −1 | −2 | 6 | 7 |
| WEIGHTING FACTOR | 0 | 0 | 0 | 6 | 6 |
| WEIGHTED CH. POWER | 0 | −1 | −2 | 0 | 1 |

The weighted channel powers are next used to calculate a desired DGE attenuation change (step 640) or the amount of DGE attenuation (in units of dB), on a channel-by-channel basis, that yields a spectrum in which the channels within each band have a desired target power or intensity level value. The DGE attenuation change is calculated, typically by NCP 216, by negating the weighted channel power for each shown in Table 2.

TABLE 2

| CHANNEL | 1 | 2 | 3 | 4 | 5 |
|---|---|---|---|---|---|
| WEIGHTED CH. POWER | 0 | −1 | −2 | 0 | 1 |
| ATTENUATION CHANGE | 0 | 1 | 2 | 0 | −1 |

The attenuation change values are supplied as control signals to DGE 214 to selectably adjust the initial measured power levels of the transmitted optical signals so that the desired target values are achieved. In the example discussed above, when these attenuation change values in Table 2 are applied to the channels having power levels shown listed in Table 1, the resulting power levels are adjusted to the corresponding target values (see Table 3).

TABLE 3

| CHANNEL | 1 | 2 | 3 | 4 | 5 |
|---|---|---|---|---|---|
| ATTENUATION CHANGE | 0 | 1 | 2 | 0 | −1 |
| INITIALLY MEASURED POWER | 0 | −1 | −2 | 6 | 7 |
| ADJUSTED POWER | 0 | 0 | 0 | 6 | 6 |
| TARGET | 0 | 0 | 0 | 6 | 6 |

The invention described herein is not limited to the implementations and specific embodiments described above. For example, the signals power levels can be adjusted to any appropriate target value. Accordingly, the channels 1 through 3 above could have power levels adjusted to have a first negative tilt value, while power levels associated with channels 4 and 5 could be adjusted to have a second negative tilt value. As a result the following target values could be obtained 0.5 dB (channel 1), 0.25 dB (channel 2), 0 dB (channel 3), 5.75 dB (channel 4), and 5.5 dB (channel 5).

The above description of the method consistent with the present invention assumes that application of the attenuation change values alone to the DGE yield signal power levels meeting the desired target levels. Often, however, non-idealities associated with the DGE cause the adjusted power levels to be shifted from the desired target levels. Thus, in the example discussed above, each of channels 1-5 may be shifted from their respective target values by 1 dB, for example, so that each of channels 1-3 has a power level of 1 dBm and channels 4 and 5 have a power level of 7 dB. After application of the attenuation change values, a determination is made as to whether aggregate insertion loss (IL) or gain associated with DGE 214 and amplifier stage 322 exceeds a predetermined threshold for these parameters (step 650). If so, in step 660, an offset voltage can be adjusted and applied to the DGE to reduce or increase the signal power levels to within an acceptable margin about the target power values. After supplying the offset voltage to DGE 214, no further adjustments are required (step 670), unless undesired channel power levels are later sensed. Moreover, if aggregate DGE insertion loss or gain does not exceed the predetermined threshold, no further adjustments are need until undesired channel power levels are subsequently detected (670).

Other implementations than those described above are contemplated. For example, signals in group or band 410 may be encoded in accordance with a forward error correction (FEC) code, while signals in band 420 may be non-FEC signals. Also, although signals at OC-48 and OC-192 rates have been described above, a band including signals at OC-768 rates having target power value(s) can also be achieved consistent with the present invention.

Thus, in a WDM system, optical signals with different rates can be adequately accommodated, thereby providing for increased system flexibility.

While the foregoing invention has been described in terms of the embodiments discussed above, numerous variations are possible. For example, although adjustment of optical powers to desired power target levels has been described above, adjustment of other optical parameters, such as OSNR, to desired levels is also contemplated by the present invention. In which case, OPM 220 can transmit OSNR data for each channel and the channel OSNR values can be adjusted by varying DGE attenuation to achieve desired target values. Accordingly, modifications and changes such as those suggested above, but not limited thereto, are considered to be within the scope of the following claims.

What is claimed is:

1. An optical communication device, comprising:
    a plurality of optical transmitters, each of which outputting a respective one of a plurality of optical signals, each of said plurality of optical signals having a corresponding one of a plurality of wavelengths, each of a first group of said plurality of optical signals having a first data rate and being adjacent one another in wavelength, and each of a second group of said plurality of optical signals having a second data rate and being adjacent one another in wavelength, said first data rate being different than said second data rate;
    an optical multiplexer configured to receive said plurality of optical signals, and supply said plurality of optical signals to an optical communication path;
    a plurality of weighting factors stored in a weighted power table and used to calculate a plurality of weighted signal power values; and
    a dynamic gain equalization circuit coupled to said optical communication path, said dynamic gain equalization circuit being configured to selectively adjust a power level of each optical signal based at least in part on said plurality of weighting factors, with said first and second groups of said plurality of optical signals such that each optical signal within said first group has an intensity substantially equal to a first intensity value, and each optical signal within said second group has an intensity substantially equal to a second intensity value, said first intensity value being different than said second intensity value; and
    wherein a plurality of multiple rate signals in more than one optical channels, and in more than one channel bands, are adjusted on a channel-by-channel basis in each band to a desired power spectrum for each optical channel.

2. An optical communication device in accordance with claim 1, wherein said first group of optical signals conforms to a SONET OC-192 protocol, and said second group of optical signals conforms to a SONET OC-48 protocol.

3. An optical communication device in accordance with claim 1, wherein said first group of optical signals conforms to an SDH OC-192 protocol, and second group of optical signals conforms to an SDH OC-48 protocol.

4. An optical communication device in accordance with claim 1, further comprising an optical performance monitoring circuit configured to detect an optical parameter associated with said first and second groups of optical signals, said optical performance monitoring circuit being configured to generate a sense signal in response to said detected optical parameter, said dynamic gain equalization circuit selectively attenuating said first and second groups of optical signals in response to said sense signal.

5. An optical communication device, comprising:
    a plurality of optical transmitters, each of which outputting a respective one of a plurality of optical signals, each of said plurality of optical signals having a corresponding one of a plurality of wavelengths, each of a first group of said plurality of optical signals having a first data rate and being adjacent one another in wavelength, and each of a second group of said plurality of optical signals having a second data rate and being adjacent one another in wavelength, said first data rate being higher than said second data rate;
    an optical multiplexer configured to receive said plurality of optical signals, and supply said plurality of optical signals to an optical communication path;
    a plurality of weighting factors stored in a weighted power table and used to calculate a plurality of weighted signal power values; and
    a dynamic gain equalization circuit coupled to said optical communication path, said dynamic gain equalization circuit being configured to selectively attenuate said first and second groups of optical signals based at least in part on said plurality of weighting factors, such that an electrical signal-to-noise (Q) value is substantially uniform for each optical signal within said first and second groups of said plurality of optical signals; and
    wherein a plurality of multiple rate signals in more than one optical channels, and in more than one channel bands, are adjusted on a channel-by-channel basis in each band to a desired power spectrum for each optical channel.

6. An optical communication device in accordance with claim 5, wherein said first group of optical signals conforms to a SONET OC-192 protocol, and said second group of optical signals conforms to a SONET OC-48 protocol.

7. An optical communication device in accordance with claim 5, wherein said first group of optical signals conforms to an SDH OC-192 protocol, and second group of optical signals conforms to an SDH OC-48 protocol.

8. An optical communication device in accordance with claim 5, wherein said first group of optical signals carriers information encoded in accordance with a forward error correcting code, and said second group of optical signals carries information not encoded in accordance with said error correcting code.

9. An optical communication method, comprising the steps of:
    transmitting a plurality of optical signals in an optical waveguide, each of said plurality of optical signals having a corresponding one of a plurality of wavelengths, each of a first group of said plurality of optical signals having a first data rate and being adjacent one another in wavelength, and each of a second group of said plurality of optical signals having a second data rate and being adjacent one another in wavelength, said first data rate being higher than said second data rate; and
    selectively attenuating said optical signals within said first and second groups signals based at least in part on a plurality of weighing factors stored in a weighted power table and the calculation of a plurality of weighted signal power values such that an optical parameter associated with each of said optical signals within said first group is adjusted to have substantially a first parameter values, and an optical parameter associated with each of said optical signals within said second group is adjusted to have substantially a second parameter value; and
    wherein a plurality of multiple rate signals in more than one optical channels, and in more than one channel bands, are adjusted on a channel-by-channel basis in each band to a desired power spectrum for each optical channel.

10. An optical communication method in accordance with claim 9, wherein said optical parameter is an optical signal-to-noise ratio.

11. An optical communication method in accordance with claim 9, wherein said optical parameter is an optical intensity.

12. An optical communication method in accordance with claim 9, wherein said first group of optical signals conforms to a SONET OC-192 protocol, and said second group of optical signals conforms to a SONET OC-48 protocol.

13. An optical communication method in accordance with claim 9, wherein said first group of optical signals conforms to an SDH OC-192 protocol, and second group of optical signals conforms to an SDH OC-48 protocol.

14. An optical communication method, comprising the steps of:

measuring a plurality of optical signal powers values in more than one optical channels;
　obtaining weighting factors from a weighted power table;
　calculating a plurality of weighted signal power values;
　determining a plurality of attenuation change values in response to said plurality of weighted signal powers and said measured optical signal power values; and
　adjusting a transmission spectrum of a dynamic gain equalization circuit in response to said plurality of attenuation change values; and
　wherein a plurality of multiple rate signals in more than one optical channels, and in more than one channel bands, are adjusted on a channel-by-channel basis in each band to a desired power spectrum for each optical channel.

15. An optical communication method in accordance with claim 14, wherein said determining step further includes a step of subtracting a plurality of weight factors from said plurality of measured optical signal power values.

16. An optical communication method in accordance with claim 14, further comprising the step of adjusting a voltage offset supplied to said dynamic equalization circuit.

* * * * *